(No Model.)
H. K. PORTER.
Bolt Cutter.
No. 236,695.
Patented Jan. 18, 1881.
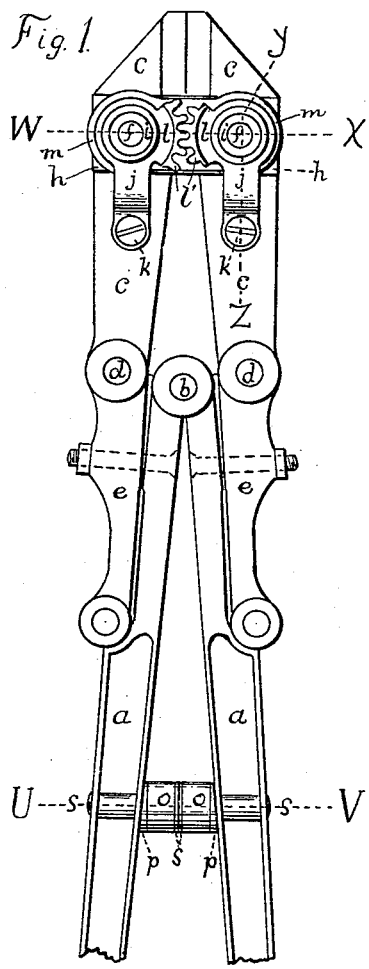
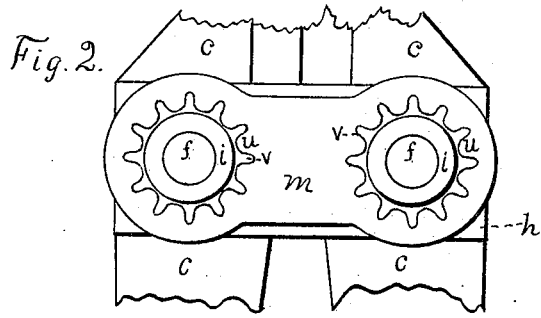
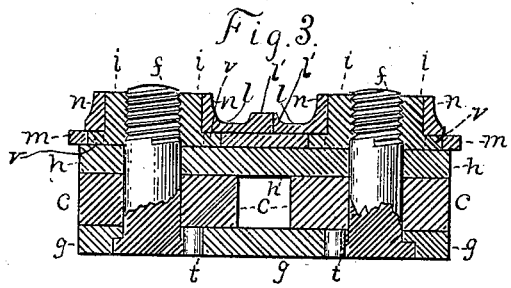
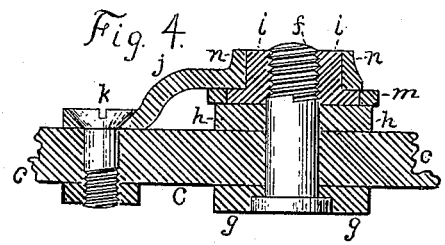
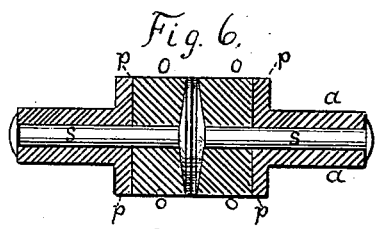
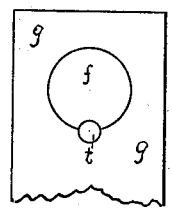
Witnesses:
Walter J. Dudley
H. H. Letteroy
Inventor:
Henry K. Porter
By Porter & Hutchinson Attys
N. PETERS, PHOTO-LITHOGRAPHER, WASHINGTON, D. C.

UNITED STATES PATENT OFFICE.

HENRY K. PORTER, OF BOSTON, MASSACHUSETTS.

BOLT-CUTTER.

SPECIFICATION forming part of Letters Patent No. 236,695, dated January 18, 1881.

Application filed November 20, 1880. (No model.)

*To all whom it may concern:*

Be it known that I, HENRY K. PORTER, of Boston, in the State of Massachusetts, have invented Improvements in Bolt-Cutters, of which the following is a specification.

This invention relates to improvements in bolt-cutters formed with compound levers, the invention being shown in the annexed drawings as embodied in a bolt-cutter similar in construction to that patented by me on the 6th day of April, 1880, and it will, in connection with said drawings, be hereinafter fully described, and specifically defined in the appended claims.

Figure 1 is a top or plan view of a bolt-cutter similar to that patented by me, as above stated, with my present improvements thereto applied. Fig. 2 is an enlarged plan view of a portion of the cutting jaws or levers with the front pivotal devices thereto applied, but with the equalizing-gears omitted. Fig. 3 is a vertical transverse section taken as on line W X, Fig. 1. Fig. 4 is a vertical longitudinal section taken as on line Y Z, Fig. 1. Fig. 5 is a detached inverted or under-side view, showing the bolt-locking device. Fig. 6 is a vertical transverse section taken on line U V, Fig. 1.

In said views, *a* represents the long or handle levers by which the cutter is manipulated, said levers being in part broken away in the drawings. The pivotal connection of said levers is shown at *b*.

The cutting jaws or levers *c c* are, at their ends, pivoted at *d* to the supplemental or adjusting levers *e*, which, for the purposes of this application, may be regarded as identical with levers *a*. Said levers *c* are, near their front ends, pivoted upon bolts *f*, which latter are secured in the lower strap, *g*, and the top strap, *h*, said bolts being formed with a round head seated in a counter-bore in strap *g*, and locked from rotation by the pins *t*, which engage the heads of said bolts and the inclosing-walls of such counter-bores, as shown in Figs. 3 and 5. Upon the opposite or threaded ends of said bolts the nuts *i* are fitted. These nuts are formed with a circle of teeth, *v*, at their base, and are locked in place by plate *m*, whose teeth *u* correspond with and fit into the teeth of said nuts, as shown in Fig. 2. This locking-plate is secured in place by the arms *j*, which are bolted to levers *c* by bolts *k*, while from their hollow hub *n*, which fits upon the sleeve-like portion of nut *i*, extends the arm *l*, upon the outer face of which is formed the convex arc of teeth *l'*, which, by their interlocking, as shown in Fig. 1, secure the cutter from oblique motion when being opened or closed.

To prevent shock to the nerves and muscles, and consequent injury, when using the cutter, I arrange the elastic cushions or buffers *o o* on the broad-headed spindles *s*, which latter are loosely secured in an enlargement in levers *a*, as shown, a disk-like base, *p*, being thus formed on said levers to afford a broad seat for buffers *o o*. When, by giving way of the bolt which is being cut, the levers *a* are, by the force which is being exerted thereon, brought suddenly together, and the force of the shock is absorbed by buffers *o o*, which are thereby compressed, the spindles *s* move therewith, as they fit loosely in levers *a*, as stated.

I am aware that it is common to place an elastic cushion between the handles of punches and other one-hand cutting-tools, close to the pivot thereof, to act as an opening-spring; but the buffers which I employ are distinguishable therefrom, as they do not and cannot act as such opening-springs, as they are arranged at such distance from the lever-pivot as to only be compressed after the levers have been moved through almost their entire track, and are brought nearly together, when said buffers arrest the motion of said levers by a cushioning resistance, the leverage thereon being (from their position) but slight.

What I claim as my invention is—

1. In a bolt-cutter, and in combination with levers *a a*, an elastic buffer arranged upon said levers to arrest their converging motion by a cushioning resistance as the cutting-jaws are brought together, substantially as specified.

2. In a bolt-cutter, the combination of levers *c c*, screw-bolts *f*, with their supporting-straps, the nuts *i*, with their teeth *v*, and the locking-plate *m*, formed with the corresponding internal teeth, *u*, substantially as specified.

3. In combination with levers *c c*, the screw-bolts *f*, straps *g h*, the toothed nuts *i*, and correspondingly-toothed locking-plate *m*, and the pins *t*, inserted in bolts *f*, and strap *g*, to interlock the same, substantially as specified.

4. In a bolt-cutter, the arms *j*, bolted to levers *c*, and formed with the hollow hub *n*, and inclosing-nut *i* on bolts *f*, and having the projections *l*, provided with their interlocking teeth, substantially as specified.

HENRY K. PORTER.

Witnesses:
T. W. PORTER,
EBEN HUTCHINSON.